Sept. 15, 1970 J. ASHWORTH 3,529,134

TIMING CONTROL MECHANISM FOR DATA PROCESSING APPARATUS

Filed Nov. 29, 1966 4 Sheets-Sheet 1

INVENTOR.
JOHN ASHWORTH

BY
Warren F. B. Lindsley

ATTORNEY

TIMING CONTROL MECHANISM FOR DATA PROCESSING APPARATUS

Filed Nov. 29, 1966 4 Sheets-Sheet 2

Sept. 15, 1970 J. ASHWORTH 3,529,134

TIMING CONTROL MECHANISM FOR DATA PROCESSING APPARATUS

Filed Nov. 29, 1966 4 Sheets-Sheet 3

Sept. 15, 1970 J. ASHWORTH 3,529,134

TIMING CONTROL MECHANISM FOR DATA PROCESSING APPARATUS

Filed Nov. 29, 1966 4 Sheets-Sheet 4

United States Patent Office 3,529,134
Patented Sept. 15, 1970

3,529,134
TIMING CONTROL MECHANISM FOR DATA PROCESSING APPARATUS

John Ashworth, San Jose, Calif., assignor to General Electric Company, a corporation of New York
Filed Nov. 29, 1966, Ser. No. 597,774
Int. Cl. G06k *7/16*
U.S. Cl. 235—61.11 19 Claims

ABSTRACT OF THE DISCLOSURE

A timing mechanism for deriving timing signals to control a sensing mechanism to sense intelligence data contained on a moving record wherein the moving record drives the timing mechanism to derive signals indicative of the position of the data on the record relative to the sensing mechanism.

This invention relates to apparatus for reading coded information and more particularly to an improved means for timing and synchronizing the transmission of information read, column by column, from an information bearing record to a data processing machine.

In high speed data processing systems widely used today, information processed by the system is supplied from an external source which source may utilize information stored on magnetic tapes, thermoplastic recording tapes, documents bearing magnetic ink imprints, punched cards and the like.

The standard Hollerith punched cards for storing information contain eighty vertical columns in which information is stored in the form of punched holes relatively spaced in the columns. Each column contains twelve possible locations at which a hole may be punched. Thus, this resultant card contains eighty vertical columns and twelve horizontal rows and a hole may be punched at the intersection of any column and row. The columns are customarily consecutively numbered, one through eighty, beginning at the leading edge of the card and the rows are numbered from the top to the bottom of the card.

The information stored in the punched card may be represented in any arbitrary code, with any arbitrary combination of holes punched in a given column representing any desired symbol such as a numerical or alphabetical character or other arbitrary symbol.

The information read from the cards by a card reader is supplied, usually in the form of electrical signals, to a computer system or in some applications directly to a control system for performing one or more specific functions. The processing of such information introduces problems in synchronization of the electrical signals representative of the intelligence contained on successively sensed card portions or columns with the operations to be performed on such information.

Heretofore, synchronizing pulses have been provided by detecting a black mark printed on the margin of the card in line with each column. Such a system has the advantage of providing accurate synchronization but has the disadvantages of not being able to synchronize the reading of punched cards not having the black marks preprinted thereon. Another known system utilizes a timing disc mounted on a shaft which is mechanically synchronized with the shaft of a feed roller, the disc being provided with black marks or slots which are detected photoelectrically to provide timing signals for synchronizing the transfer of information from the card reader to a data processor. One disadvantage of such a system is that the card feed roller may cause slippage between the card and the roller as the card is being read, thereby introducing errors which are cumulative as the card moves through the card reader. Other known timing devices are driven synchronously with the card feed rollers or belts which propel the card being read. This type of card reader relies on friction between the card and the drive rollers or belts to keep the card synchronized with the timing track and introduces an error whenever slippage occurs between the card and feed belts or rollers.

Another prior art system employs a sensor which triggers a generator to start the generation of timing pulses when the leading edge of the card reaches a given position in its travel through the card reader. Such a system insures that a first timing pulse occurs at the time that the first column of the card is in position to be read. Other timing pulses follow the first pulse at regular intervals so that a perfectly aligned card, moving at a predetermined speed, would have a column in position to be read each time a timing pulse occurs. Each timing pulse causes an information signal existing during the timing pulse to be transferred to the data processor. Card expansion or contraction due to moisture, deviations in the location of holes in the card and slippage between the card and the card moving mechanism may cause timing pulses to occur at times when holes in later columns of the card are not at the sensing station. Prior art systems usually resynchronize the generator with later columns of the card a number of times as each card moves past the sensing station. This resynchronization requires a large amount of circuitry which is bulky and expensive to construct.

In accordance with the invention claimed, a new and improved apparatus is disclosed utilizing a card synchronizing self-timing control system. A very low mass timing belt is driven by the leading edge of the card being read which is in contact with a tab or projection on the belt. The distance from the tab on the belt to the first hole in the timing track in the belt is precisely the same as the distance from the leading edge of the card to the first information or data column on the card. As used herein, information and data are synonymous. Subsequent holes in the belt which line up exactly with each succeeding data column on the card are provided.

The sensing device which reads the timing track on the belt is in line with the sensors which read the data columns on the card. Therefore, when the timing sensor reads the first hole in the timing belt track, any data holes in the card read at this time must be in column one. When the second timing hole in the timing belt track is read, any data holes read at this time must be in column two, and so forth for each column in the card.

It is, therefore, one object of this invention to provide an improved timing control mechanism for data processing apparatus.

Another object of this invention is to provide an improved timing control mechanism for a moving record data processing device.

A further object of this invention is to provide an improved timing means for a data processing apparatus which maintains synchronized movmeent with the moving record being processed.

A still further object of this invention is to provide an improved card reader in which the timing means identifies the card's position at any moment during its movement past the data sensors.

A still further object of this invention is to provide an improved timing means for a card reader which is correlated with the velocity of movement of each card through the card reader structure.

A still further object of this invention is to provide an improved timing mechanism for a card reader which is synchronized with movement of the tabulating card and is independent of any change in the velocity of the card.

Other objects and advantages of the present invention will be apparet from the following specification taken in conjunction with the accompanying drawings wherein.

Figure 1:
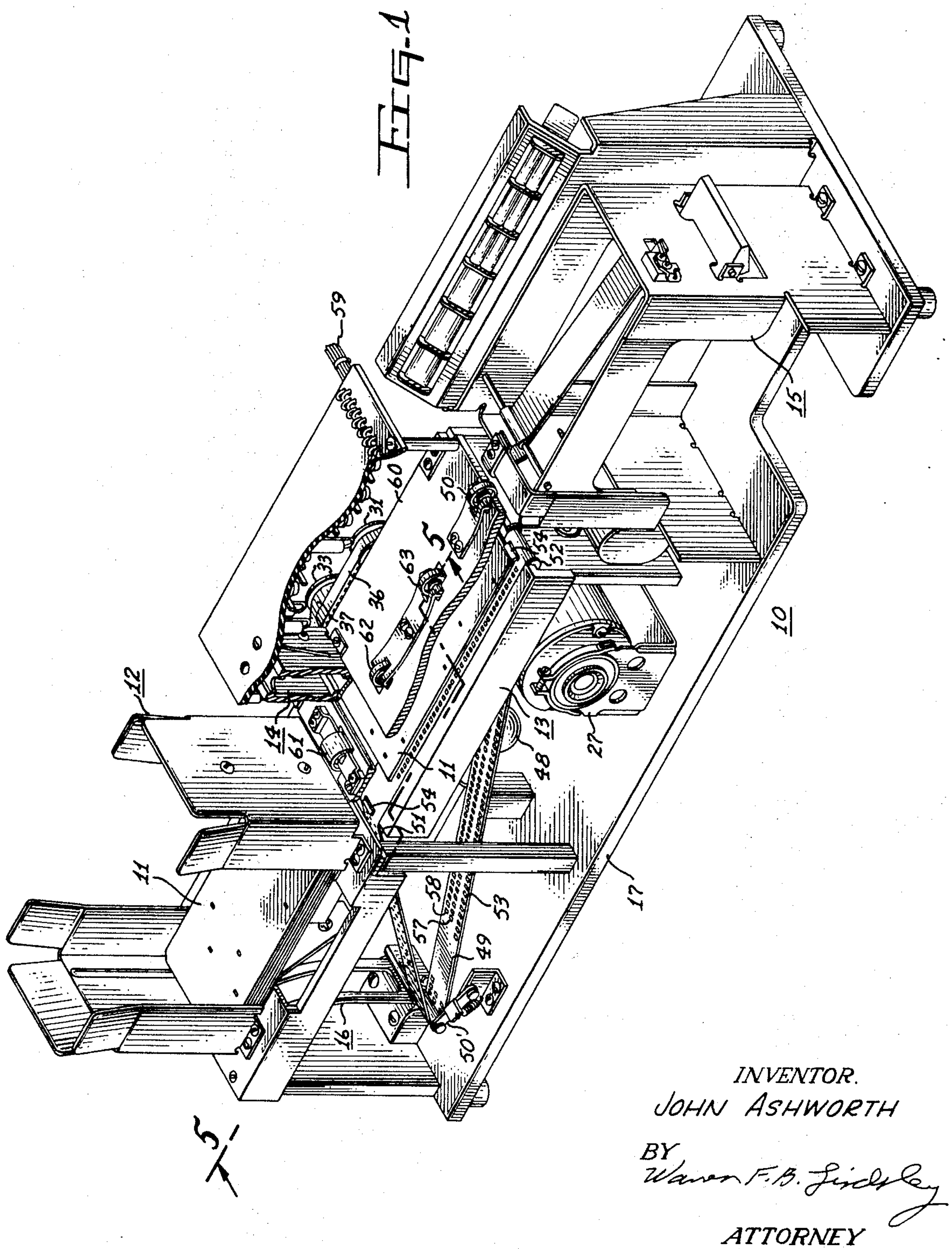
FIG. 1 is a perspective view, partly in section, of a card reader constructed in accordance with the principles of the present invention.

Referring more particularly to the drawings by characters of reference, FIG. 1 discloses an information processing device such as a serial card reader 10 for processing data from a moving record such as, for example, a plurality of tabulating or opaque punched cards 11. The card reader broadly comprises a gravity feed storage card hopper 12 wherein the punched cards are stacked and individually fed to a card transporting mechanism 13. The card transporting mechanism 13 moves the cards past a card interrogating or reading station 14 where the data is sensed to a card collector 15 where the cards are received and stacked after interrogation.

As previously mentioned, the tabulating or punched cards 11 may comprise a plurality of data columns in which information, in this instance in the form of specially located punched holes, may be contained in one or more positions in each column. One example of such a tabulating card is the Hollerith card commonly used in today's data processing systems. The punched cards are fed one at a time from the storage card hopper 12 by means of a picker knife 16 shown in FIGS. 1 and 5.

Picker knife 16 is provided for delivering the punched cards 11 one at a time from the storage hopper 12 to the card transporting mechanism 13 and comprises a single V-shaped piece of resilient material such as a spring steel cantilever mounted at the end of one of its leg members to base 17 of card reader 10. The other leg member 18 of the V-shaped picker knife is rotatably attached to a single revolution clutch member 20 for rotation about its axis 21. Rotation of clutch member 20 causes rotation of leg member 18 of picker knife 16 thereby causing a generally linear reciprocal movement of the apex or bight of the V-shaped picker knife. A knife edge 22 is provided at the outer surface of the bight of picker knife 16 for engaging an end edge of the punched card 11 and driving the card longitudinally of the card reader structure through a throat 23 shown in FIG 5 to the card transporting mechanism 13. As the picker knife 16 is cantilever mounted to the base of the card reader, pure linear reciprocal movement of the knife edge 22 is impossible; however, the deviation from pure linear reciprocal movement, although small, is advantageous since it insures that no damage will occur to the remaining cards in the storage hopper because the edge of the picker knife will be moving away from the storage hopper during the latter part of its card driving movement.

Figure 5:
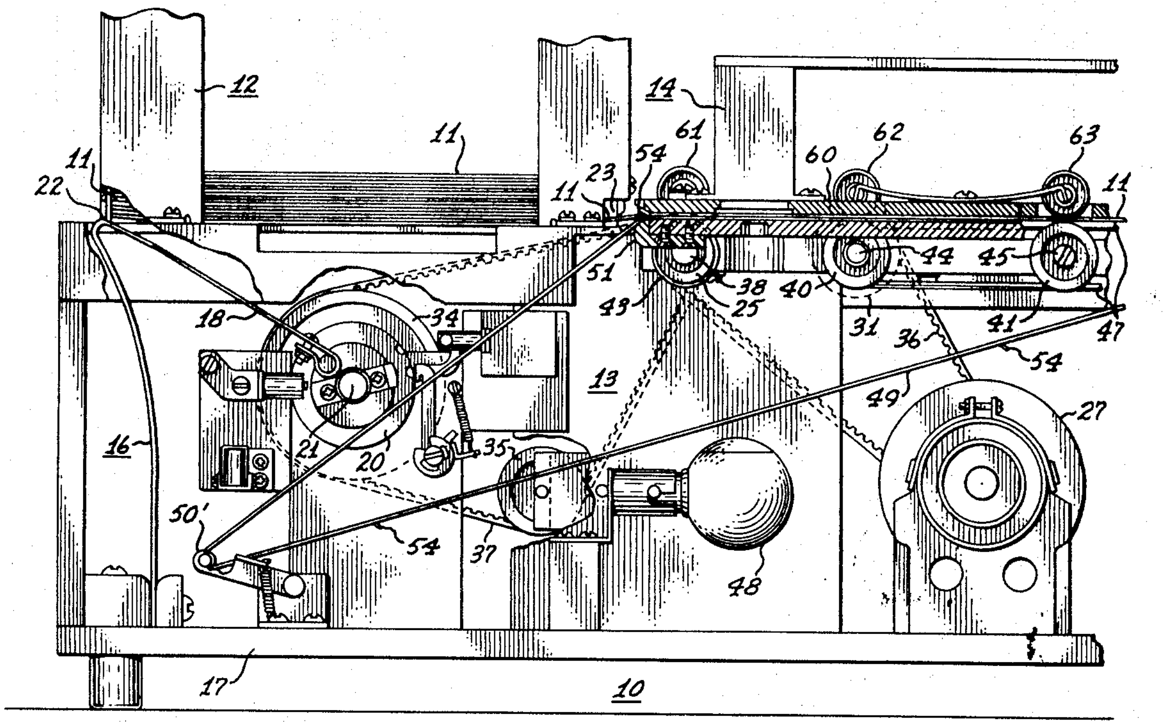
FIG. 5 is an enlarged cross sectional view of the structure shown in FIG. 1 taken along the line 5—5.

When a signal is received by the card reader structure from a control means (not shown) indicating that a card should be read, the free end of the picker knife leg member 18 is rotated from the position shown in FIG. 5 initially to the left a short distance in order for the knife edge 22 to engage the bottom punched card in the storage hopper 12. Further rotation of the free end of the picker knife causes the knife edge 22 to move to the right to deliver a card through throat 23 and out of the storage hopper to feed roller 25 of the card transporting mechanism 13.

This stroke of the picker knife is continuously repeated for each signal received from the control means (not shown) requiring a read card operation. On each cycle the card in the lowest position in the storage hopper is moved out of the stack of punched cards after which the remainder of the stack in the gravity feed storage hopper 12 drops down and the process is repeated in this manner for each following card. A weight (not shown) may be placed on top of the card stack to assure that there is always enough pressure to keep the punched cards moving down through the storage hopper and also to press the individual cards flat so that they mate properly with the knife edge 22 and the exit or throat opening 23. In order to assure that only one punched card is picked up on each cycle, the height of the knife edge 22 is slightly less than the thickness of a standard punched card while the height of the throat opening is between one and two such thicknesses.

Figure 6:
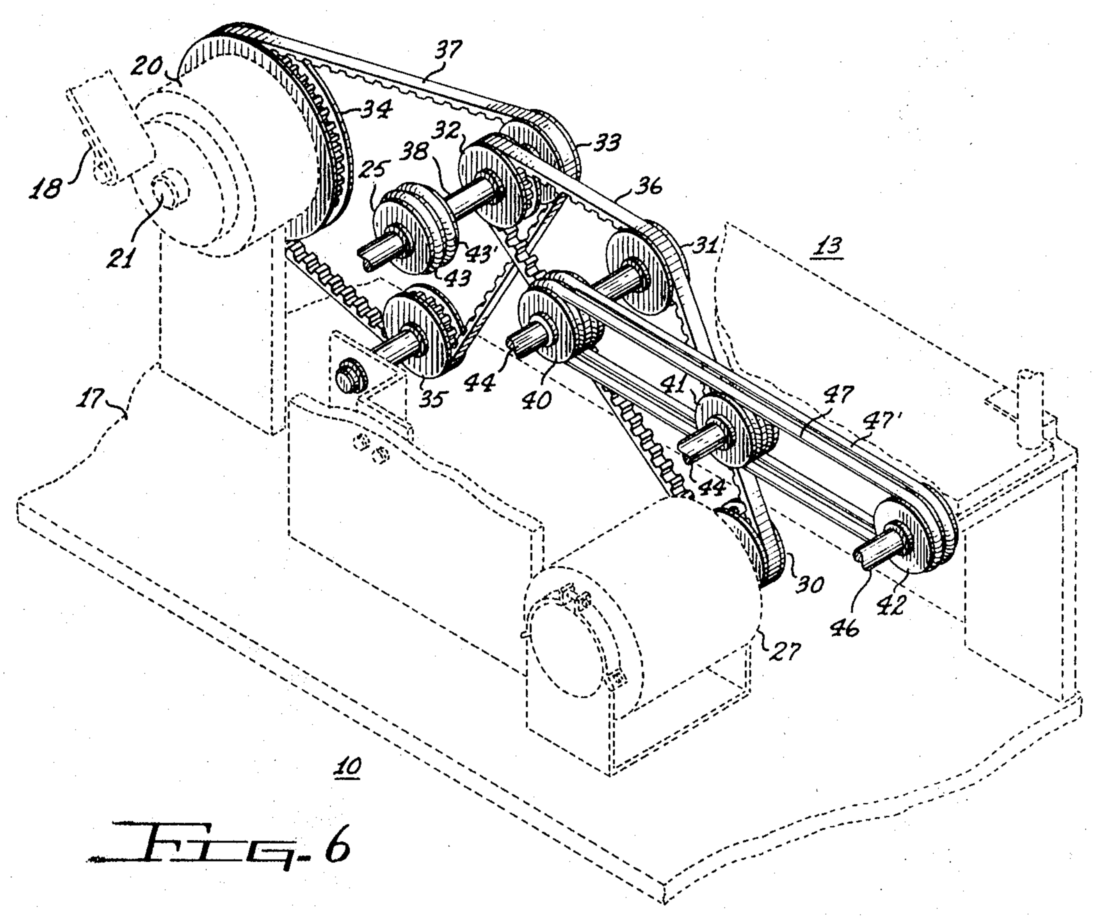
FIG. 6 is an enlarged partial perspective view of the structure shown in FIGS. 1 and 5 illustrating in full lines in more detail the card transporting mechanism.

Electric motor 27 provides the prime moving force for actuating the picker knife 16 and the card transporting mechanism 13 through a set of drive and driven sprockets 30, 31, 32, 33, 34 and 35 interconnected by a plurality of drive belts 36 and 37. More particularly, motor 27 drives sprocket 30 which drives rotatably mounted driven sprockets 31 and 32 by means of an interconnecting drive belt 36. As shown in FIG. 6, sprocket 32 is fixedly mounted on shaft 38 for rotation therewith and, upon rotation thereof by drive belt 36, rotates drive sprocket 33 arranged juxtapositioned thereto on shaft 38. Drive sprocket 33 drives driven sprocket 34 by means of the interconnecting drive belt 37. Driven sprocket 34 is mounted on axis 21 of clutch member 20. Upon receipt of a read signal by the card reader, clutch 20 is momentarily actuated in the usual manner by the driven sprocket 34 causing the picker knife 16 to remove one card from the card reader and to cause it to move to the card transporting mechanism 13.

The card transporting mechanism further comprises a plurality of card drive or feed rollers 25, 40, 41, and 42 shown in FIG. 6. Roller 25 is mounted on shaft 38 and is arranged to provide a groove surface at its outer periphery for housing a pair of belts 43, 43'. Each belt is made of suitable material for frictionally engaging and moving the punched cards passing over roller 25.

Driven sprocket 31 is fixedly mounted on shaft 44. Shaft 44 supports for rotation therewith feed roller 40 and drives this feed roller upon rotation of sprocket 31 by motor 27. Feed rollers 41 and 42 are mounted on shafts 45 and 46, respectively, and are interconnected by drive belts 47, 47'.

As noted from FIG. 6 of the drawings, feed rollers 25, 40, 41 and 42 are spaced longitudinally of the card reader along a given path. Cooperating with each feed roller is a pinch roller rotatably mounted on the frame of the card reader structure. As seen in FIG. 1, pinch rollers 61, 62, 63 and 50 abut the feed rollers 25, 40, 41 and 42 and the drive belts associated therewith so that a punched card passing between the feed and pinch rollers is held in frictional engagement with drive belts 43, 43' and 47, 47' for continuing movement of the card. As a result of the punched card being in engagement with the feed and pinch rollers, the card is transported through the reading station 14 and ultimately to the card collector 15.

As seen in FIG. 1, a punched card travels only a short distance from the card hopper 12 before it is interrogated at the reading station 14. Although any suitable interrogating means may be used, a photoelectric system is shown and disclosed. Specifically, the interrogating means may comprise a plurality of spaced photoresistors one for each row in the punched card to be read and one for the timing mechanism. A suitable lamp 48 is disposed in the card reading station 14 and so positioned that the tabulating or punched cards pass between the lamp and the photoresistors when moved by the card transporting mechanism. Lamp 48 as shown in FIGS. 1 and 5 is mounted below the punched cards and photoresistors of the reading station and may be marked by a plate having a narrow slit. The slit and the photoresistors are vertically aligned so that the amount of light and its beam direction are carefully controlled Discrete electrical signals or synchronizing impulses indicating the presence or absence of a punched hole in each row of the card being read are transferred via external conductors 59 to a data processor where the information read from the punched cards is ultilized.

As each punched card passes between the lamp and the various photoresistors, illumination from the lamp passing through punched holes in the card impinges on the photoresistors causing their electrical resistance to decrease. By connecting the photoresistors to suitable electrical circuitry, signals are obtained which are representative of the information recorded on the punched cards.

As previously mentioned, it is necessary for the card reader to know when the reading station of the card reader senses the data on the card and more particularly to know exactly which data column on a tabulting or punched card is being read. The present invention provides a movable signal generating element such as a positively driven timing means which moves at exactly the same speed as the punched card being interrogated so that it is possible to determine which data column on a punched card is being read. This timing means may, for example, comprise a light responsive endless timing belt 49 which is wrapped about a plurality of guiding members 50′, 51 and 52. The guiding member 50′ is spring loaded so as to maintain tension on the timing belt 49.

Figure 2:
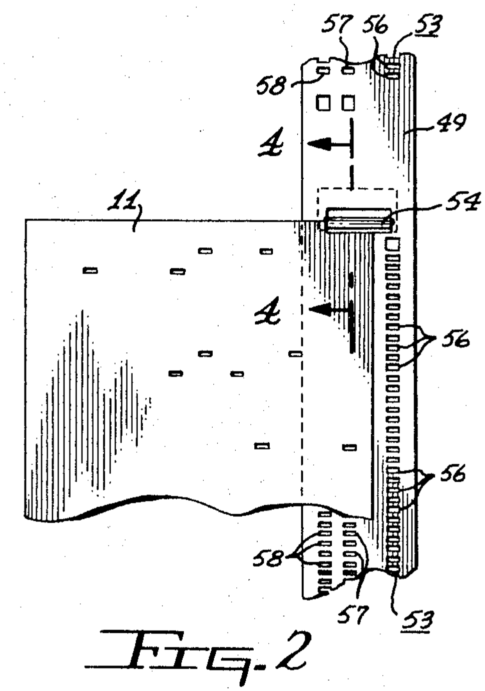
FIG. 2 is an enlarged partial top view of the timing belt shown in FIG. 1 with a punched card positioned adjacent one of the belt tabs.
Figure 3:
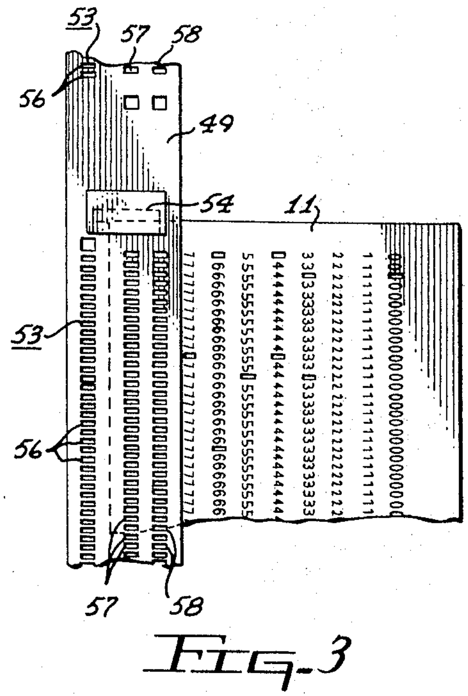
FIG. 3 is a bottom view of the timing belt and card arrangement shown in FIG. 2.
Figure 4:
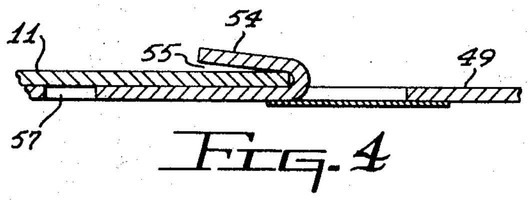
FIG. 4 is an enlarged cross sectional view of the timing belt shown in FIG. 2 taken along the line 4—4.

Timing belt 49 is mounted adjacent the lateral edge of the card transporting mechanism and is so arranged on the card reader that it is engaged by the punched card as the card is moved through the card reader by the card transporting mechinism. The timing belt is provided with a plurality of elements such as tabs 54 spacedly arranged along the length of the belt. These tabs may be cut from and formed integrally with the material forming the belt or may be of like or different material fixedly attached to the belt. Each tab is arranged to extend laterally from the surface of the belt and may be bent back against the timing belt so as to form a notch 55 between the tab and the belt. A punched card upon traveling a short distance through the card reader along the given path by the card transporting mechanism 13 engages in a predetermined position one of the notches 55 on the timing belt 49 and pushes the timing belt along with it as it moves through the card reader structure. FIGS. 2, 3 and 4 illustrate how the punched card engages one of the notches formed by a tab and the timing belt.

The timing belt 49 is provided with an elongated timing track 53 having successive light responsive elements spaced in correspondence to the successive recording of data in the card and comprising more particularly a plurality of apertures or holes 56 cut through the belt material immediately downstream of each tab 54. These holes are arranged to extend in a row along the length of the belt, as shown in FIGS. 1, 2 and 3. These holes are so arranged that each hole coresponds to a column position on the punched card which abuts against the tab. These holes in timing belt 49 pass a photoresistor in the reading station and, due to the light passing through the holes, develops timing signals one for each hole in the timing track.

Since each punched card moving through the card reader must overlap a portion of the timing belt 49 in order to drive the belt, two further groups of apertures or holes 57 and 58 are arranged along the length of the timing belt. Groups of holes 57 and 58 are arranged to align with given rows of the punched cards so that any data in the form of punched holes, selectively positioned at the intersections of the matrix of the vertical columns and the two lowest horizontal rows on the punched card, may be interrogated by the card reader and will not be blocked from interrogation by the material of the belt. A belt which overlaps a portion of the card also permits the use of a tab extending across all or a good portion of the width of the timing belt. Thus, the tab of the timing belt overlaps a relatively wide portion of the leading edge of the punched card being read, thereby eliminating or substantially reducing the possibility of damaging the corner of the punched card.

FIGS. 2 and 3 illustrate a partial view of the movable endless timing belt 49 and a standard 80 column, 12 row punched card showing the recorded punched information, represented by rectangular impressions or holes, at the intersections of the various rows and columns. The punched holes in the cards 11 represent binary 1's and the blanks (i.e., no punch impressions) at the intersections of the various rows or columns represent binary 0's in the logic circuitry used to connect the card reader to a processor (not shown).

As noted from FIGS. 2 and 3 of the drawings, the timing track 53 is preceded by a large rectangular hole which causes light to fall on a given photoresistor in the reading station 14 causing a signal to occur which alerts or starts the timing operation. Each following aperture in the timing belt is downstream a given distance from the data column of the associated punched card being read so that the logic circuitry associated with the reading or interrogation of the data columns of the punched card may be properly correlated and provide in cooperation with the moving record a signal indicative of the position of the record or card being sensed. Thus, it is possible to detect by means of the timing signal which data column is being interrogated at any time during the reading of a punched card as long as no error exists between the timing belt 49 and the punched card 11.

To ensure that no error exists, the distance from each of the tabs 54 on the timing belt 49 to the first aperture in the timing track is made precisely a given distance correlated with the distance from the leading edge of a punched card to the first data column on the card. Thus, there is a subsequent aperture 56 in the timing track 53 that is correspondingly spaced with each succeeding data column in the punched card being read. Since the photoelectric interrogating means in the reading station which reads the timing track 53 is aligned or correlated with the photoresistors which read the data columns, information contained in the first data column is simultaneously read with the first signal generated by the timing track and, as the belt and punched card proceeds through the card reader, each subsequent data column is read and synchronized with each subsequent timing signal generated by the timing track of the timing belt.

The timing belt 49 is made of low mass material requiring very little force to accelerate and continue its movement while still being of suitable strength and durability to withstand thousands of starting and stopping operations. In this instance, an aluminum belt coated with Mylar (a polyester film made from polyethylene terephthalate and produced by the Du Pont de Nemours Company) has been used to provide the desired operating characteristics. However, it is not the intention of this disclosure to be limited by the composition of the belt since any material may be used that exhibits the qualities of low mass strength and durability.

Figure 7:
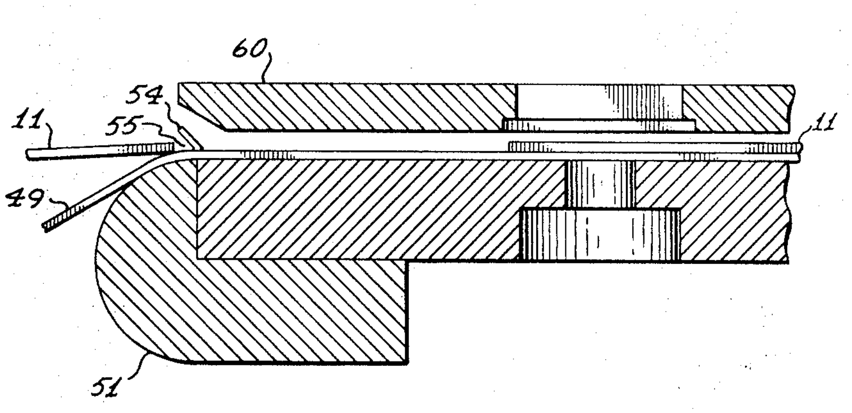
FIG. 7 is an enlarged cross sectional view of the card entranceway to the card transporting mechanism illustrating how the timing belt tabs are bent over the card during a card reading operation.

Thus, the punched card contacts the tab of timing belt 49 as it is moved on to feed roller 25 by the knife edge 22 of the picker knife 16. The tab is bent back over the card as shown in FIGS. 4 and 7 as the card moves through the card reader. Although the card is normally bent downstream of the direction of movement of the timing belt, the throat formed by guiding member 51 and the frame structure 60 of the card reader further bends the tab over the punched card, if necessary, as it moves through the card reader structure.

The engagement of the punched card with the tab 54 of timing belt 49 occurs before the data columns on the punched card arrive at the reading station 14 and remains in contact with the tab until after the last data column on the punched card has been interrogated. In order to facilitate contact between the punched cards and the timing belt, the distance between tabs on the timing belt is greater than the length of a card. Since the mass of the timing belt is very low, the momentum generated by the velocity of the card is low, thereby causing the timing belt to come to rest very quickly after the driving force of the card has been removed from the timing belt. Hence, timing belt 49 is positively driven by the punched card being interrogated. Thus, data columns on the punched card are always synchronized with the timing belt regardless of changes in the velocity of the punched card. By utilizing such an arrangement, the probability of misreading a punched card is greatly reduced or eliminated.

After the punched card has been interrogated by the reading station, it is moved by the driving belts 47, 47' to the card stacker 15. During the movement of the punched cards by belts 47, 47', the timing belt is moved by the punched card. When the punched card is driven into the card stacker 15, it disengages from the timing belt and is collected under the influence of gravity in the card stacker. Since the timing belt 49 has three tabs 54 spacedly arranged along its length, it may be engaged readily by each successive card being read without unreasonable time delay.

Figure 8:
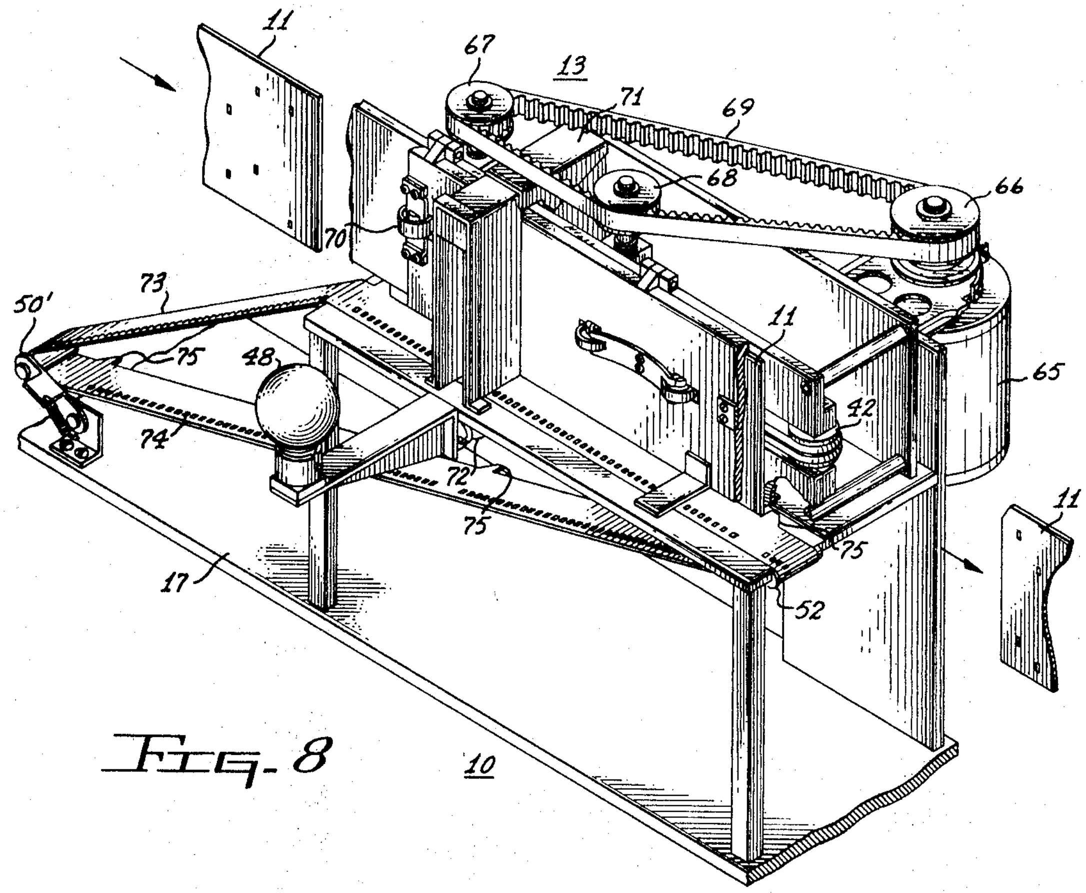
FIG. 8 is an enlarged partial view of a modification of the structure shown in FIG. 1 wherein the tabulating cards are vertically moved through the card reader.
Figure 9:
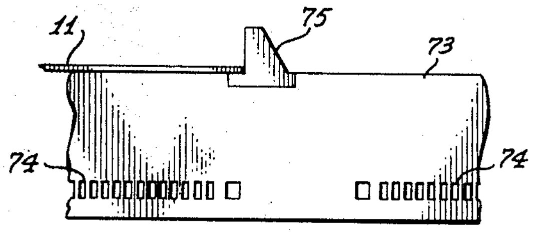
FIG. 9 is an enlarged partial top view of the belt timing means shown in FIG. 8 illustrating how the tabulating card engages the belt timing means.

FIGS. 8 and 9 disclose a modification of the structure shown in FIGS. 1 through 7 wherein the punched cards 11 are driven on edge vertically through the card reader structure. As shown in FIG. 8, a motor 65 by means of sprockets 66, 67, 68 and a drive belt 69 drive a feed roller (not shown) upon receipt of a read card signal in the manner disclosed in the description of FIGS. 1 through 7. The feed roller in cooperation with the pinch roller 70 drives punched card 11 past a reading station 71 of the type heretofore described. In this instance, however, lamp 48 is mounted so as to cast a horizontal beam of light through the reading station. A second source of light such as lamp 72 is arranged below the timing belt 73 in order to provide a beam of light through the timing track 74 punched in the timing belt 73. The photocell or photoresistor mounted for receiving the light beam passing through the timing belt is mounted in the reading station transversely to the photoresistors arranged for sensing the data in the data columns of the punched card 11. In order to be operative, the photoresistor mounted for receiving the light beam passing through the timing track on the timing belt 3 must be so arranged that it is insensitive to the light beam from lamp 48. This can be arranged by embedding the photoresistor in its mounting so that it is sensitive only to the beam of light from source 72.

Although timing belt 73 functions in the same manner as timing belt 49, it is modified to cooperate with the vertical rather than horizontal movement of the punched cards through the card reader structure. As such, it is provided with tabs 75 substantially flush with the top surface of the timing belt but projecting laterally of the timing belt. With this structure, the punched card moves side by side with the timing belt and engages with the tab and moves the tab and timing belt in the manner shown and described in FIGS. 1 through 7. Tabs 75 may be an integral part of the timing belt as shown in FIG. 8 or attached to the timing belt as shown in FIG. 9.

While the principles of the invention have now been made clear in two illustrative embodiments, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A timing control mechanism for data processing apparatus wherein intelligence contained upon a moving record is sensed by a sensing mechanism comprising: a movable endless timing means arranged to be driven by the moving record, and means associated with said timing means for providing a signal indicative of the position of the record being sensed by the sensing mechanism.

2. The timing control mechanism as described in claim 1 wherein the movable endless timing means is arranged to be driven by the record during the record's movement past the sensing mechanism.

3. The timing control mechanism as described in claim 1 wherein said signal indicative of the position of the record being sensed is generated by the sensing mechanism.

4. The timing control mechanism as described in claim 1 wherein said means associated with said movable endless timing means provides a series of discrete signals each indicative of a different position of the record being sensed by the sensing mechanism.

5. The timing control mechanism as described in claim 1 wherein said means associated with said movable endless timing means provides a series of discrete electrical synchronizing impulses representative of the position of the record being sensed.

6. A timing control mechanism for data processing apparatus wherein intelligence contained upon a moving record is sensed by a sensing mechanism comprising: a stationary data sensing mechanism, a movable signal generating element elongated in the direction of record movement and arranged to be driven by the moving record, and means associated with said signal generating element for causing predetermined positional engagement of said signal generating element with the record for providing in cooperation with the moving record a signal indicative of the position of the record being sensed.

7. The timing control mechanism as described in claim 6 wherein said moving record is an opaque record.

8. The timing control mechanism as described in claim 6 wherein said moving record is a punched card.

9. The timing control mechanism as described in claim 6 wherein said movable signal generating element is light responsive.

10. A timing control mechanism as described in claim 6 wherein said means comprises a tab projecting from said signal generating element.

11. A timing control mechanism as described in claim 6 wherein said signal generating element is a timing belt.

12. A timing control mechanism for a processing apparatus operative to process intelligence data contained upon an opaque moving record card comprising: a stationary data sensing mechanism, a light source, an elongated light responsive movable element disposed to receive light from said source and arranged to be driven by the moving record card, means associated with said movable element for causing predetermined positional engagement of said movable element with the leading edge of said record card, said movable element being sensed for providing a plurality of sequential signals representative of sequential positions of the moving record card being sensed by the sensing mechanism.

13. A timing control mechanism as described in claim 12 wherein said movable element comprises a timing belt and said means comprises a tab projecting from said timing belt.

14. The timing control mechanism as described in claim 12 in further combination with means responsive to said signals for converting the same to discrete electrical impulses for synchronizing associated processing apparatus.

15. A card synchronizing timing control mechanism for a data processing apparatus operative to process intelligence data successively recorded in an opaque card comprising: a stationary data sensing means, a light source, a movable endless timing belt comprising an elongated timing track having successive light responsive elements spaced in correspondence to the successive recording of data in the card and positioned to receive light from said source, said timing belt being arranged to be driven by the card, means for causing predetermined positional engagement of said movable timing belt with the card, and means for sensing the elements of said timing track to derive a series of signals of which each signal corresponds to a particular position of the card being sensed by said sensing means.

16. The timing control mechanism as described in claim 15 wherein said means for causing predetermined positional engagement of said movable timing belt with the card comprises a plurality of tabs fixed to and projecting from said timing belt wherein each of said tabs is bent against said timing belt to form a notch engageable by the card for movement of said timing belt.

17. The timing control mechanism as described in claim 15 wherein said light responsive elements comprise a plurality of spaced apertures.

18. The timing control mechanism as described in claim 16 wherein said light responsive elements comprise a plurality of spaced apertures.

19. The timing control mechanism as described in claim 16 wherein said light responsive elements comprise a plurality of groups of spaced apertures, one of said groups of spaced apertures being spaced downstream from each of said tabs.

References Cited

UNITED STATES PATENTS 3,173,000 3/1965 Johnson et al.
3,419,710 12/1968 Mathews et al.